United States Patent [19]
Tanaka

[11] Patent Number: 4,861,147
[45] Date of Patent: Aug. 29, 1989

[54] ZOOM LENS SYSTEM

[75] Inventor: Tsunefumi Tanaka, Kanagawa, Japan

[73] Assignee: Canon Kabushiki Kaisha, Tokyo, Japan

[21] Appl. No.: 873,464

[22] Filed: Jun. 6, 1986

Related U.S. Application Data

[63] Continuation of Ser. No. 523,728, Aug. 16, 1983, abandoned.

[30] Foreign Application Priority Data

Aug. 17, 1982 [JP] Japan ................... 57-143109
Aug. 17, 1982 [JP] Japan ................... 57-143110

[51] Int. Cl.$^4$ .............................................. G02B 15/00
[52] U.S. Cl. ................... 350/429; 350/427
[58] Field of Search ............... 350/427, 428, 429, 430; 354/195.1, 195.12

[56] References Cited

U.S. PATENT DOCUMENTS

| | | | |
|---|---|---|---|
| 3,773,402 | 11/1973 | Gala et al. | 350/428 |
| 3,992,084 | 11/1976 | Nakamura | 350/428 |
| 3,997,245 | 12/1976 | Uesugi | 350/430 |
| 4,161,756 | 7/1979 | Thomas | 350/429 |
| 4,281,907 | 8/1981 | Kamata | 350/429 |
| 4,421,389 | 12/1983 | Muryoi | 350/429 |
| 4,432,615 | 2/1984 | Ikemori | 350/427 |
| 4,492,437 | 1/1985 | Masumoto et al. | 350/428 |

Primary Examiner—Bruce Y. Arnold
Assistant Examiner—Loha Ben
Attorney, Agent, or Firm—Toren, McGeady & Associates

[57] ABSTRACT

In a focusing method for the rear focus type of zoom lens where the range in which the focusing lens should be present for focusing to different object distances varies with zooming, the focusing lens is prevented from moving to the outside of the aforesaid range as zooming is performed. For this purpose, either the range of movement of the focusing lens is limited by a zooming lens arranged in front or in rear of the focusing lens, or the focusing lens is allowed to stand still regardless of zooming when focusing is effected on an object at a shortest distance.

9 Claims, 5 Drawing Sheets

ZOOM LENS SYSTEM

This is a continuation of application Ser. No. 523,728, filed Aug. 16, 1983.

BACKGROUND OF THE INVENTION

1. Field of the Invention

This invention relates to focusing methods for zoom lenses, and, more particularly, to the use of a lens component nearer to the image plane in focusing, or a so-called rear focusing method.

2. Description of the Prior Art

In the art of zoom lenses of the general type comprising three or four components, or so-called 3-component and 4-component zoom lenses, there have been known many proposals for employing one of the components in the rear assembly, behind the zoom components, for focusing purposes, or the so-called rear focusing method. This rear focusing method is particularly advantageous when employed in the optical systems of autofocus cameras. That is, owing to this method, the focusing lens is small in bulk and light in weight, which is very advantageous at speeding up the focusing operation and reducing the load on the drive system for focusing the lens.

The zoom lenses employing such focusing method is, however, generally accompanied with the following drawback, which will be explained by reference to FIG. 1 where the inconvenient situation of the movable components for zooming and focusing encountered when focusing is followed by zooming is depicted.

Figure 1:
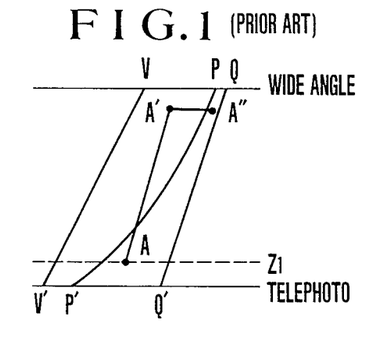
FIG. 1 is a diagram of a geometry considered to explain the prior art rear focusing method for zoom lenses.

In the developed view of FIG. 1, line V—V' represents the path of movement of a component for variation of the image magnification when zoomed in front of a focusing component, line P—P' the path of movement of the focusing component when zooming with an object at the shortest possible distance, and line Q—Q' the path of movement of the focusing component when zooming with an object at infinity. Now assuming that the focusing component lies at a point A with the zoom component at a station Z1 to effect focusing to a finite object distance. When zooming from that position toward the wide angle position, since the shape of the camming slot for the focusing component provided in the zoom control sleeve is conformed to the path of movement of the focusing component for an infinitely distant object, the focusing component moves in a path parallel with the line Q—Q', reaching a point A'. For the given object distance, however, the in-focus position is jumped to a point A". To perform focusing, therefore, the focusing component has to be moved from the point A' to the point A". It is in the camera system having an automatic focusing function that a focusing condition for the point A' is detected to produce a signal by which the operation of the drive motor is then controlled to adjust the focusing component to the point A". In essence, however, for every object in the prescribed range of distances from inifinity to a certain shortest one, what position the focusing component necessarily takes to effect focusing can be found to exist in a quadrangular area PP'Q'Q of FIG. 1, while the point A' representing an object distance in a closeup range beyond the above-defined focusing range. Thus, a large proportion of the focusing movement from the point A' to the point A" is of no significance in principle. This implies that the establishment of the in-focus condition is delayed. Further, there is some possibility of occurrence of a focusing control signal of which the level is either zero or only noises when the point A' is detected, contributing to a cause of faulty operation of the automatic focussing apparatus.

It is known to provide means for preventing this focusing lens from being moved away from that space in which it should exist for the normal focusing range by zooming in Japanese Laid-Open Patent Application No. Sho 56-162727. According to this prior art, use is made of a member having a shape in conformity with the curve PP' shown in FIG. 1 as arranged in the mounting mechanism so that this member plays the role of a stopper, thus achieving the maintenance of the focusing lens in the space that is limited to a longitudinal length and a location depending upon the zooming position despite focusing being followed by zooming to any position. However, the difficulty of when to incorporate such non-linear restricting member into the mechanical mounting for the lens system, the difficulty of finely adjusting the position of the restricting member, and, further, the complexity of structure of the mechanical mounting, are very much increased.

SUMMARY OF THE INVENTION

It is an object of the invention to provide a focusing method which enables the wasteful movement of the focusing lens to be minimized, the time until attainment to the sharp focus to be shortened, and further to provide that no faulty operation occurs, and one that is suited to the automatic focusing function. Furthermore, it is an object of the invention to provide a zoom lens employing such method.

Another object of the invention is to provide a focusing method which enables prevention of the focusing lens from moving away from the existing region, for focusing to be achieved by a simple means.

In the focusing method according to the present invention, by the zooming lens being adjacent to the focusing lens, moving of the focusing lens outwardly of a space that accommodates it for focusing purposes is prevented so as to achieve the above-stated objects. To this end, in the zoom lens of the invention, the lens system is so designed that the path of zooming movement of that zooming lens, which is adjacent to the focusing lens, and the path of movement of the focusing lens, which assures the focusing on an object at infinity or at the shortest distance as zooming accompanies, are parallel to each other. In other words, when the interval between the focusing lens and the one of the zooming lenses which is arranged on the object or image side of the focusing lens is maintained constant during zooming, the in-focus condition for the infinite distance or closeup object is not broken. In more greater detail, when in a zoom lens having a plurality of lens groups Z for zooming is focused by one of the lens groups other than the first lens group counting from front, or lens group F, it is with the lens group F in focus on the closest or infinitely distant object that when such focusing is followed by zooming, no matter which form the lens group F may take, the simultaneous movement with zooming, or the subsequent movement after zooming, the resulting distance between the lens group F and the forwardly or rearwardly adjacent lens group in a new zooming position has the same value as that in the preceding zooming position, while permitting an object the lens system is focused on to be found either at the shortest distance or at infinity. This provides an advantage that when focusing up or down to a new object distance, the minimum distance that the lens group F has to move suffices so that the focusing time can be shortened.

Also, in another focusing method according to the present invention, when the focusing lens, movable for focusing positioned on the image side of the zoom section with inclusion of the zoom section, is focused on the closest object, its position has, despite zooming, to be always maintained constant, whereby it is made possible to accomplish the above-stated objects. That is, the focusing is performed by the lens group F in the rear of the zoom section, including the zoom groups Z or the lens group for variation of the image magnification and the lens group for compensating for the shift of the image plane resulting from the variation of the image magnification, so that the image plane is maintained in the constant position despite zooming being performed by moving only the above-described zoom section Z when the abovedescribed lens Group F is in focus to the closest object. In the zoom lens having such focusing provision in the rear of the zoom section Z or in the lens group F, the refractive powers and the paths of zooming movement of all the lens groups constituting the zoom section Z, are chosen so as to leave the lens group F stationary in a focusing position for the closest object while still maintaining the constant position of the image plane against zooming.

BRIEF DESCRIPTION OF THE DRAWINGS

FIGS. 13A and 13B show illustrations of arrangements of lens groups in zoom lens according to the present invention.

FIG. 14 shows an illustration of another arrangement of lens groups in a zoom lens according to the present invention.

DESCRIPTION OF THE PREFERRED EMBODIMENTS

Figure 2:
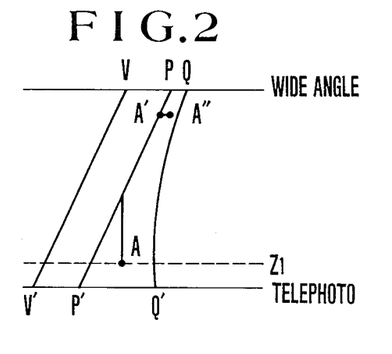
FIGS. 2, 3 and 4 are diagrams of a geometry considered to explain a method for focusing zoom lenses with the focusing member moving in different ways respectively according to the present invention.
Figure 3:
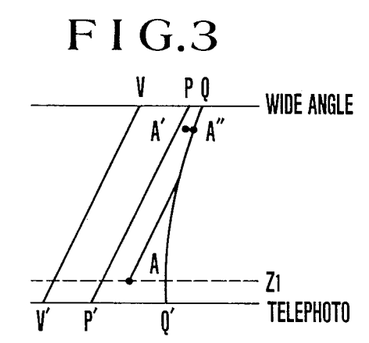
Figure 4:
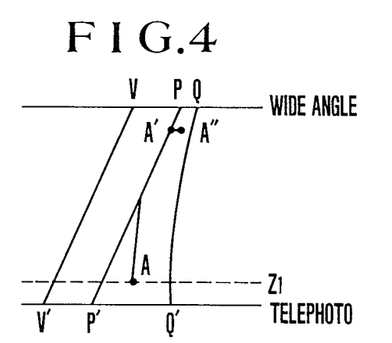

FIGS. 2, 3 and 4 illustrate, similarly to FIG. 1, the focusing method for zoom lenses according to the present invention.

The space for movement of the focusing lens group F is depicted as an area defined by the lines connecting points PP'Q'Q, and the lens group F when lying on the line PP' is assumed to be focused on the closest object. It should be pointed out here that the line PP' is parallel to the line VV' that represents the path of zooming movement of the lens group V1 just in front of the lens group F. Though the illustrated embodiment has been described in connection with the lens group F preceded by that zoom group, it is also possible that the lens group F is followed by a lens group for zooming. If so, the above-designated feature may be such as to be parallel to the path of zooming movement of this zoom group.

FIG. 2 illustrates a manner in which the lens group F operates as, for example, in direct drive connection with a servo motor, or a pulse motor.

Figure 5:
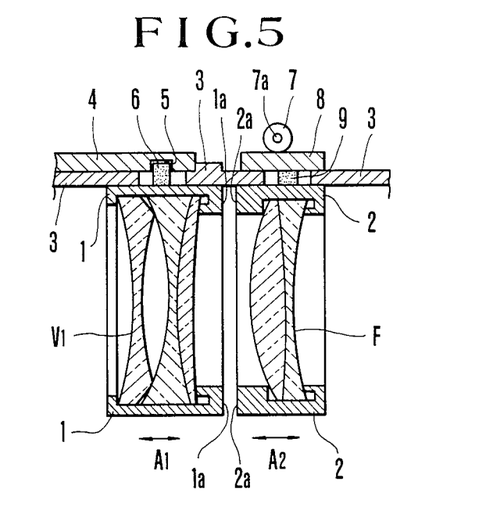
FIGS. 5 and 6 are fragmentary sectional views of mechanical mountings for the zoom lens of the invention with different operating mechanisms for the focusing member.

Suppose a lens holder for the group V1 and another lens holder for the group V contact with each other just when focusing to the closest object is effected, then it is certain that a movement of the lens group F beyond the line PP' to the front never occurs. In view of this fact, a practical example of a mechanical mounting for the lens system can be constructed as schematically illustrated in FIG. 5, where 1 is a member holding the lens group V1; and 2 is a member holding the lens group F, whereby the rear end surface 1a of the holding member 1 and the front end surface 2a of the holding member 2 come in contact with each other in a focusing position for the closest object distance. Element 3 is a fixed sleeve; element 4 is a zoom ring; element 5 is a zooming groove cut in the zoom element ring; 6 is a pin fixedly secured to the aforesaid holding member 1 and fitted in the aforesaid zooming groove. Therefore, when the zoom ring 4 rotates, the aforesaid pin 6 moves along the shape of the zooming groove, thereby the lens group V1 is also moved in directions indicated by arrow A1. Element 7 is a pinion of which shaft 7a is connected to a focusing drive motor (not shown). Element 8 is a rack meshing with the aforesaid pinion 7. Element 9 is a member for fixing the aforesaid holding member 2 and rack 8 as a unit. Therefore, when the motor (not shown) rotates, the pinion 7 rotates. This rotative movement is transmitted by the rack 8 to axial linear movement by which the lens group F is moved in directions A2 through the member 9. As has been stated above, the lens group F has its front end of movement limited by the lens group V1 when zooming.

Therefore, as illustrated in FIG. 2, when zooming to the wide angle positions from a position Z1 where the focusing lens group F lies at a point A, the lens group V1 first abuts on the focusing lens group F in another zooming position and then pushes the latter along the line PP' to a point A'. Then, the lens group F is moved from the point A' to a point A" by means of, for example, the automatic focusing function. Since the point A' represents the focusing position for the closest object, it is guaranteed to form a control signal for automatic focusing adjustment as a function of the response of the position sensor. Another advantage is that the excursion A'A" of FIG. 2 is far shorter than that of FIG. 1 in the prior art. Further, as for the focusing to an infinitely distant object, the opposite terminal end of movement of the focusing lens group F can be defined as the line QQ' by restricting means either in an electrical form, or in the form of an abutment provided in the mechanical mounting for the lens system. Thus, the lens group F for focusing never moves beyond the line QQ' to the rear. Therefore, the focusing speed is improved, and a faulty operation is prevented from occurring.

Figure 6:
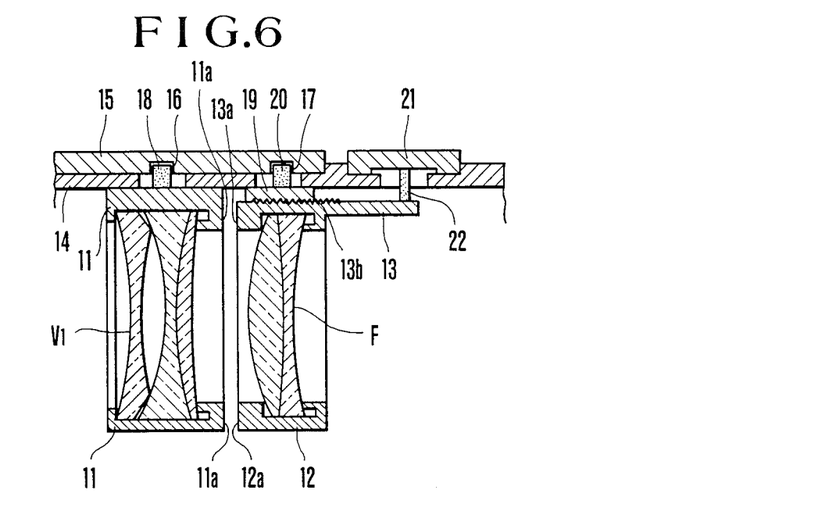

FIG. 3 represents another case where, since the lens group F is borne on a zooming control cam for the lens group V1, when zooming is being performed from the position Z1, the lens group F is moved in a fixedly spaced relation to the lens group V1 until it strikes the abutment. Then, an independent movement is imparted to the focusing lens group F by the abutment. FIG. 6 illustrates a practical example of a mechanical mounting as adapted to such case. In FIG. 6, element 11 is a member holding the lens group V1, and elements 12 and 13 are members holding the lens group F, the holding member 13 being formed in part 13b to a helicoid. Element 14 is a body tube; element 15 is a zoom ring, zoom grooves 16 and 17 being provided in the inner surface of the zoom ring in parallel relation to each other. Fitted in the zoom groove 16 is a pin 18 fixedly secured to the aforesaid holding member 11. On the other hand, fitted in the zoom groove 17 is a pin 20 fixedly secured to a cam inner sleeve 19 meshing with the helicoid portion 13b of the aforesaid holding member 13. A focusing ring 21 is drivingly connected to the aforesaid holding member 13 through a member 22 which is affixed thereto. It is noted here that the driving connection between the focusing ring 21 and the member 22 is established in rotative directions, so that ring 21 and member 22 rotate together and is not established in axial directions permitting independent movement of the member 22, with respect to the focusing ring 21 in axial direction. Further, when the lens group F is in focus on the closest object, it is, regardless of the zooming position, provided that the end surface 11a of the holding member 11 and the end surface (12a, 13a) of the holding members (12, 13) are in contact with each other. Therefore, the front terminal end of movement of the lens group F is limited by the lens group V1. In the illustrated embodiment of FIG. 3, by making use of a similar means to the restricting means for the QQ' line of FIG. 2, the lens group F for focusing can be prevented from moving to the outside of the area PP'Q'Q.

With an object for which the lens group F takes its position at point A, when zooming, the lens group F first moves to point A', and then to point A" so that the condition of sharpest focus is regained.

FIG. 4 represents still another case where adjustment of the in-focus position of the lens group F for the infinitely distant object with respect to the zooming position or in conformance to the curve QQ' is controlled otherwise by making use of the zooming control cam, while focusing is controlled in a manner similar to that described before. The opposite terminal end of movement of the lens group F for the closest object is adjusted to the line PP' by the lens holder for the group V1 in contact with the lens group F. Thus, the moving area PP'Q'Q is insured.

Since the course of movement of the lens group F to reach the in-focus position is the same as that described in connection with FIG. 2, an operating mechanism for all lens groups in this case may be constructed in a similar form to that described in connection with FIG. 6.

Though the illustrated embodiments of FIGS. 2 and 4 have been described with the line PP' as the path of movement with zooming of the one of the terminal ends of movement of the focusing lens which represents focusing on the closest object, it is also possible to take the line PP' as the path of movement with zooming of the opposite terminal end of focusing movement which represents focusing on the infinitely distant object.

In a more specific configuration of the abovedescribed lens groups, as shown in FIGS. 13A and 13B for example, a lens section Z is constructed with three lens groups, or from front to rear, a first lens group having a negative refractive power, a second lens group having a positive refractive power and a third lens group having a positive refractive power, wherein the third lens group is made to function as the lens group F for focusing, and the second lens group to function as an equivalent lens group to the above-described lens group V1.

It is to be noted in this case that the first lens group may be preceded by, or the third lens group may be followed by, a fixed lens group A to obtain a desired focal length or back focus.

Next, two numerical examples of the zoom lens employing the focusing method of the invention as applied to the lens system comprising three lens groups are shown.

Figure 7:
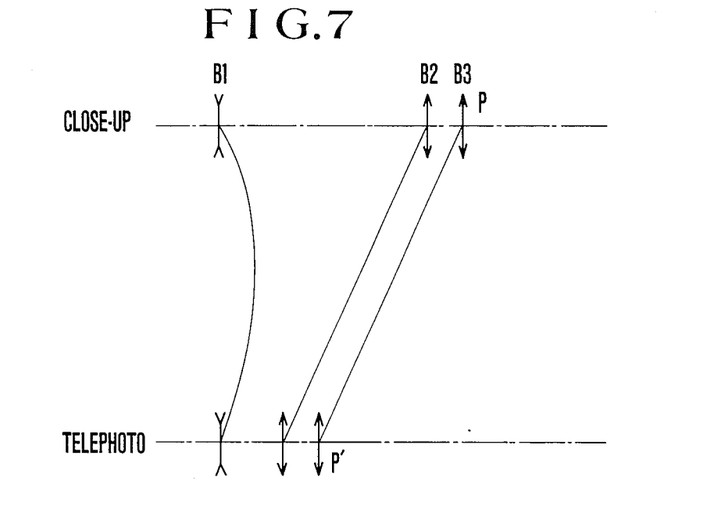
FIGS. 7 and 8 are diagrams illustrating the paths of zooming movement of the zoom lenses according to the invention.
Figure 8:
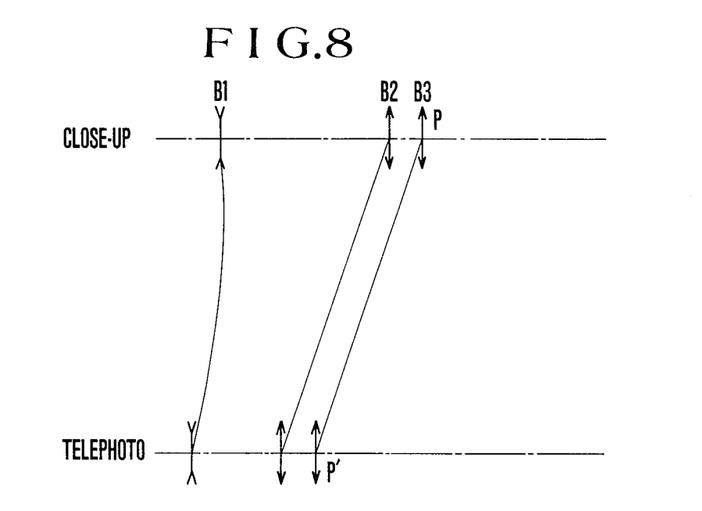

It is to be noted in connection with each of the numerical examples that, as the lens group for focusing, use is made of the third lens group. The paths of movement of all the lens groups of Examples 1 and 2 during zooming are shown in FIGS. 7 and 8, respectively.

EXAMPLE 1

|  | 1st Group | 2nd Group | 3rd Group | Entire System |
|---|---|---|---|---|
| Focal Length (mm) | −49.87 | 48.43 | 189.50 | 29.1–72.0 |

| | Interval between the Principal Points | | | | | |
|---|---|---|---|---|---|---|
| | with Object at Infinity | | | with Closeup Object | | |
| Focal Length | 1st-2nd Groups | 2nd-3rd Groups | 3rd Group Image Plane | 1st-2nd Groups | 2nd-3rd Groups | 3rd Group-Image Plane |
| 29.1 (Wide Angle) | 58.0 | 12.70 | 53.80 | 58.0 | 10.0 | 56.5 |
| 50.8 (Middle) | 28.7 | 16.68 | 69.42 | 28.7 | 10.0 | 76.1 |
| 72.0 (Telephoto) | 17.1 | 21.96 | 84.54 | 17.1 | 10.0 | 96.5 |

| Zooming Position | Focusing Movement |
|---|---|
| Wide Angle | 2.70 mm |
| Middle | 6.68 |
| Telephoto | 11.96 |

The shortest object distance measured from the image plane is taken at 735.40 mm.

EXAMPLE 2

| | 1st Group | 2nd Group | 3rd Group | Entire System |
|---|---|---|---|---|

-continued

| Focal Length (mm) | −45.0 | 57.04 | 149.39 | 36.2–65.1 |
|---|---|---|---|---|

| Focal Length (mm) | Interval between the Principal Points | | | | | |
|---|---|---|---|---|---|---|
| | with Object at Infinity | | | Closeup Object | | |
| | 1st–2nd Groups | 2nd–3rd Groups | 3rd Group-Image Plane | 1st–2nd Groups | 2nd–3rd Groups | 3rd Group-Image Plane |
| 36.2 (Wide Angle) | 50.0 | 12.89 | 69.51 | 50.0 | 10.0 | 72.4 |
| 50.7 (Middle) | 34.8 | 15.14 | 82.86 | 34.8 | 10.0 | 88.0 |
| 65.1 (Telephoto) | 26.0 | 18.02 | 96.38 | 26.0 | 10.0 | 104.4 |

| Zooming Position | Focusing Movement |
|---|---|
| Wide Angle | 2.89 mm |
| Middle | 5.14 |
| Telephoto | 8.02 |

The shortest object distance measured from the image plane is taken at 742.36 mm.

Figure 9:
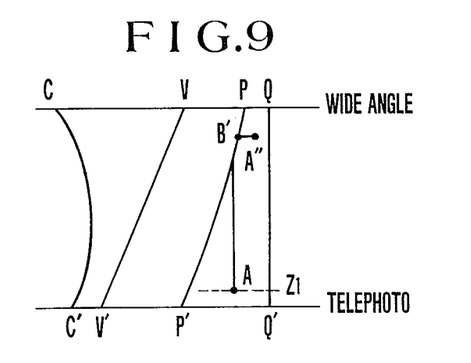
FIGS. 9 and 10 are diagrams of geometry considered to explain the optical systems using the focusing method for zoom lenses according to the present invention.

A further embodiment of the focusing method according to the present invention will next be described. FIG. 9 schematically illustrates another example of design of a zoom lens employing the focusing method of the invention where the line QQ', representing the in-focus position of the lens group F for the closest object, is made straightly vertical, indicating that with the closest object, the lens group F remains stationary during zooming. On the other hand, in order to insure that the lens group F for focusing never moves forwardly of the line PP', which represents the in-focus position of the lens group F for the infinitely distant object, there is provided a similar means to that shown in connection with FIGS. 2 to 4, or a restricting means in an electrical form, or in the form of a member constituting part of the mechanical mounting for the lens system, so that the lens group F for focusing always lies at any point in the area PP'Q'Q. Therefore, with an object at a distance corresponding to the point A, when zooming is being performed from a position Z1 to the wide angle positions, the lens group F after a while starts to move along the curved line PP', reaching a point B'. Then, from this point it is moved, for example, by an automatic focusing function, to a point A" so that focusing on that object is regained. Since the point B' represents the in-focus position for the infinitely distant object, it is sure to form an effective control signal for automatic adjustment of the lens group F as a function of the response of the position sensor. Further, in order to establish the definition of the opposite terminal end of focusing movement for the closest object as the line QQ', there is another restricting means either in an electrical form, or in the form of an abutment constituting part of the mechanical mounting for the lens system, so that a movement of the lens group F for focusing outwardly of the line QQ' to the rear never occurs. Thus, improved results in respect to the focusing speed are attained, and faulty operation is prevented from occurring.

It is to be noted in connection with FIG. 9 that the method of adjusting the lens group F may be either by using a direct drive connection with a focusing drive motor, or by providing for the operating mechanism with a member having the focusing function in the form of a helicoid or a cam movable relative to a fixed part of the lens mounting as the starting point.

Figure 10:
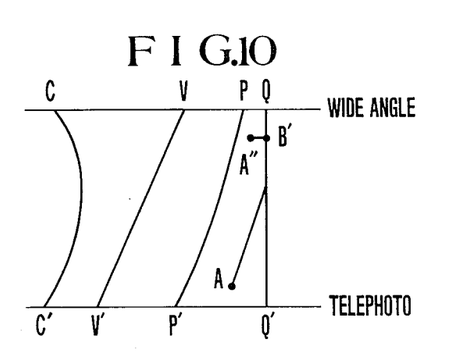

Another example of the method for moving the lens group F is illustrated in FIG. 10 where use is made of a cam shaped in conformity with the curved line PP' which represents the one of the terminal ends of focusing movement which provides focusing on an infinitely distant object. Taking this cam as the starting point, means may be provided for controlling the focusing operation through an intermediary such as the helicoid or cam. The line QQ' of FIG. 10 represents the opposite terminal end of focusing movement which provides focusing on the closest object. In order to insure that the lens group F for focusing never moves outwardly of the line QQ' to the rear, a steppeddown portion is provided in the lens mounting.

In FIG. 10, with an object at a distance corresponding to a point A, when such focusing is followed by zooming, the lens group F first moves to a point B' and then to a point A", thereby focusing on that object is regained.

The arrangement of the lens groups shown in FIGS. 9 and 10 suffices in achieving the focusing method for zoom lenses according to the present invention. For more concrete understanding, a lens configuration will next be given. As shown in FIG. 14, it is preferred that the zoom section Z is constructed from a first lens group counting from front having a negative refractive power and a second lens group having a positive refractive power, and the lens group F is constructed from a third lens group having a negative refractive power. Further, the paths of movement of the aforesaid first and second lens groups are so chosen as to allow the aforesaid third lens group to stand still against zooming while nevertheless maintaining the constant position of the image plane for the closest object.

It is to be noted here that the first lens group may be preceded by, or the third lens group may be followed by, a fixed lens group A to obtain a desired focal length or back focus.

Figure 11:
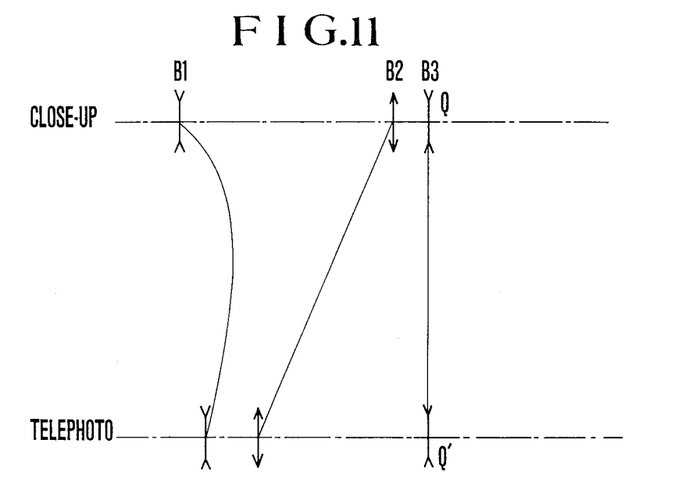
FIGS. 11 and 12 are diagrams illustrating the paths of zooming movement of the zoom lenses according to the present invention.
Figure 12:
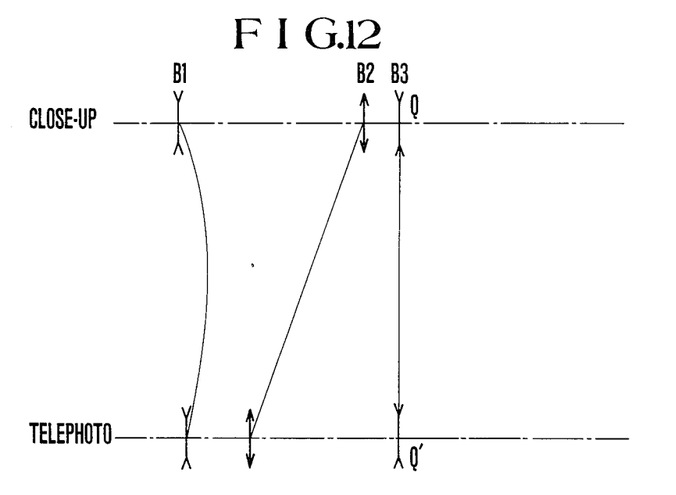

Two practical embodiments of the focusing method for zoom lenses according to the invention shown in FIGS. 9 and 10 are described below, as each of the embodiments is applied to a zoom lens comprising three lens groups. In each embodiment, the lens group for focusing is the third lens group B3. Also the paths of movement of all the lens groups during zooming in numerical examples 3 and 4 are shown in FIGS. 11 and 12, respectively.

EXAMPLE 3

|  | 1st Group | 2nd Group | 3rd Group | Entire System |
|---|---|---|---|---|
| Focal Length (mm) | −44.86 | 34.33 | −189.00 | 29.2−84.8 |

| | Interval between the Principal Points | | | | | |
|---|---|---|---|---|---|---|
| | with Object at Infinity | | | with Object at 732.55 mm from Image Plane | | |
| Focal Length (mm) | 1st-2nd Groups | 2nd-3rd Groups | 3rd Group-Image Plane | 1st-2nd Groups | 2nd-3rd Groups | 3rd Group-Image Plane |
| 29.2 (Wide Angle) | 58.0 | 8.0 | 56.6 | 58.0 | 10.0 | 54.6 |
| 56.6 (Middle) | 25.5 | 20.45 | 61.75 | 25.5 | 27.6 | 54.6 |
| 84.8 (telephoto) | 14.3 | 30.77 | 69.83 | 14.3 | 46.0 | 54.6 |

| Zooming Position | Focusing Movement |
|---|---|
| Wide Angle | 2.00 mm |
| Middle | 7.15 |
| Telephoto | 15.23 |

EXAMPLE 4

|  | 1st Group | 2nd Group | 3rd Group | Entire System |
|---|---|---|---|---|
| Focal Length (mm) | −44.86 | 35.82 | −189.0 | 35.62−84.63 |

| | Interval between the Principal Points | | | | | |
|---|---|---|---|---|---|---|
| | with Object at Infinity | | | with Object at 736.26 mm from Image Plane | | |
| Focal Length (mm) | 1st-2nd Groups | 2nd-3rd Groups | 3rd Group-Image Plane | 1st-2nd Groups | 2nd-3rd Groups | 3rd Group-Image Plane |
| 35.62 (Wide Angle) | 52.0 | 7.52 | 66.78 | 52.0 | 10.0 | 64.3 |
| 59.80 (Middle) | 27.9 | 18.7 | 71.3 | 27.9 | 25.7 | 64.3 |
| 84.63 (Telephoto) | 17.7 | 28.84 | 77.46 | 17.7 | 42.0 | 64.3 |

| Zooming Position | Focusing Movement |
|---|---|
| Wide Angle | 2.48 mm |
| Middle | 7.00 |
| Telephoto | 13.16 |

As in the above, according to the present invention, of the paths of movement of a plurality of lens groups during zooming with an object either at infinity or at a shortest distance, a lens group for focusing and one of the lens groups adjacent to this lens group are made to move in similar relation to each other, thereby it being made possible to advantageously limit a space in which the lens group for focusing is able to travel.

By another focusing method according to the present invention, as a result of taking an optical arrangement that allows the lens group for focusing to remain stationary for an object at the shortest distance during zooming, a space in which the lens group for focusing is able to travel can be limited by simple means. Thereby, for example, in application to automatic focusing, it is made possible to previously remove the unnecessary movement of the lens group for focusing so that the time necessary to reach the in-focus condition can be shortened. Also, noise signals and spurious signals resulting from the fact that the lens group for focusing otherwise takes positions for a distance range where no object is possible to exist can be prevented from occurring, thereby providing advantages that the system is protected from faulty operation, and that the filters for preventing erroneous distance measurement provided before and after the focusing computer circuit can be simplified to improve the focusing accuracy.

What I claim:

1. A zoom lens of the rear focus type comprising:
   zooming lens groups including a lens group for variation of the image magnification and a lens group for compensating for the shift of an image plane resulting from the variation of the image magnification;
   a focusing lens group having a focusing function and arranged on the image side of said zooming lens groups, whereby when said focusing lens group is in focus on an object at a shortest distance, said focusing lens group takes a constant position irrespective of a zooming position; and
   restricting means for restricting movement of the focusing lens group beyond different respective positions thereof, between a wide end and a telephoto end of the zoom lens, at which the focusing lens group focuses the zoom lens onto an infinite object.

2. A zoom lens as described in claim 1, wherein said zooming lens groups comprise, from front to rear, a lens group having a negative refractive power and a lens group having a positive refractive power.

3. A zoom lens comprising:
a plurality of lens means simultaneously movable for zooming, one of said plurality of lens means serving as focusing lens means movable for focusing, arranged on the image side of at least one of said plurality of lens means and adjacent to said at least one of said plurality of lens means, said at least one of said plurality of lens means adjacent to said focusing lens means moving during the zooming so as to occupy a position on the optical axis and determining one end of a movement range of the focusing lens means at each zooming position, said adjacent one of said plurality of lens means restricting the movement of said focusing lens means beyond said one end of the movement range.

4. A zoom lens according to claim 3, in which the movement path for zooming of said at least one of said plurality of lens means adjacent to the focusing lens means is parallel to a borderline, between a wide end and a telephoto end, passing through a position at which the focusing lens means focuses the zoom lens onto one of an infinite object and a closest object.

5. A zoom lens according to claim 4, in which the border line passes through a position at which the focusing lens means is focused onto the closest object.

6. A zoom lens according to claim 4, in which said at least one of said plurality of lens means performs magnification variation for zooming.

7. A zoom lens according to claim 3, in which the focusing lens means moves simultaneously with the remaining of the plurality of lens means, which move for zooming, at the time of zooming.

8. A zoom lens according to claim 3, in which the focusing lens means is stationary at the time of zooming.

9. A zoom lens comprising:
a plurality of lens units simultaneously movable for zooming, one of said plurality of lens units serving as a focusing lens unit arranged on the image side of the plurality of lens units and movable for focusing, moving means for simultaneously moving the plurality of lens units, having a first cam path for controlling movement of one of the plurality of lens units not including the focusing lens unit and a second cam path for controlling movement of the focusing lens unit, said first and second cam paths being parallel to each other, and said second cam path being parallel to a border line, between a wide end and a telephoto end, passing through a position which the focusing lens unit takes for focusing onto one of an infinite object and a closest object.

* * * * *